(12) United States Patent
Scholler

(10) Patent No.: US 8,451,246 B1
(45) Date of Patent: May 28, 2013

(54) SWIPE GESTURE CLASSIFICATION

(75) Inventor: Jerome F. Scholler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/470,165

(22) Filed: May 11, 2012

(51) Int. Cl.
*G06F 3/048* (2006.01)

(52) U.S. Cl.
USPC .......................................... 345/173; 715/769

(58) Field of Classification Search
USPC .................. 345/173–184; 715/769–770, 863
See application file for complete search history.

(56) References Cited

U.S. PATENT DOCUMENTS

| | | | |
|---|---|---|---|
| 2006/0227116 A1* | 10/2006 | Zotov et al. .................... | 345/173 |
| 2008/0122796 A1* | 5/2008 | Jobs et al. ...................... | 345/173 |
| 2008/0316183 A1 | 12/2008 | Westerman et al. | |
| 2009/0278806 A1* | 11/2009 | Duarte et al. ................. | 345/173 |
| 2011/0157047 A1 | 6/2011 | Nakagawa | |
| 2011/0260829 A1 | 10/2011 | Lee | |
| 2011/0307883 A1* | 12/2011 | Hilerio et al. ................. | 717/176 |
| 2012/0011438 A1 | 1/2012 | Kim et al. | |
| 2012/0098766 A1 | 4/2012 | Dippel et al. | |
| 2012/0102437 A1 | 4/2012 | Worley et al. | |
| 2012/0127098 A1 | 5/2012 | Lazaridis et al. | |
| 2012/0154303 A1 | 6/2012 | Lazaridis et al. | |
| 2012/0180001 A1 | 7/2012 | Griffin et al. | |
| 2012/0192117 A1* | 7/2012 | Migos et al. ................... | 715/863 |

OTHER PUBLICATIONS

"iOS Basics: Navigate on you iPhone or iPad", Macworld, Oct. 25, 2011, retrieved from <http://www.macworld.com/article/1163134/ios_basics_navigate_on_your_iphone_or_ipad.html>.

* cited by examiner

*Primary Examiner* — Liliana Cerullo
(74) *Attorney, Agent, or Firm* — McDermott Will & Emery LLP

(57) ABSTRACT

Systems and methods for swipe gesture classification are provided. Method includes receiving indication of swipe gesture. Indication of swipe gesture includes data representing a starting location and data representing first direction. Method includes determining whether indication of swipe gesture is associated with a hold time at starting location exceeding first threshold time. Method includes determining whether first direction is within set of possible directions associated with first command. Method includes, if first direction is within set of possible directions associated with first command and indication of swipe gesture is not associated with hold time at starting location exceeding first threshold time: providing for execution of first command. Method includes, if first direction is not within set of possible directions associated with first command or indication of swipe gesture is associated with hold time at starting location exceeding first threshold time: providing for execution of second command.

14 Claims, 6 Drawing Sheets

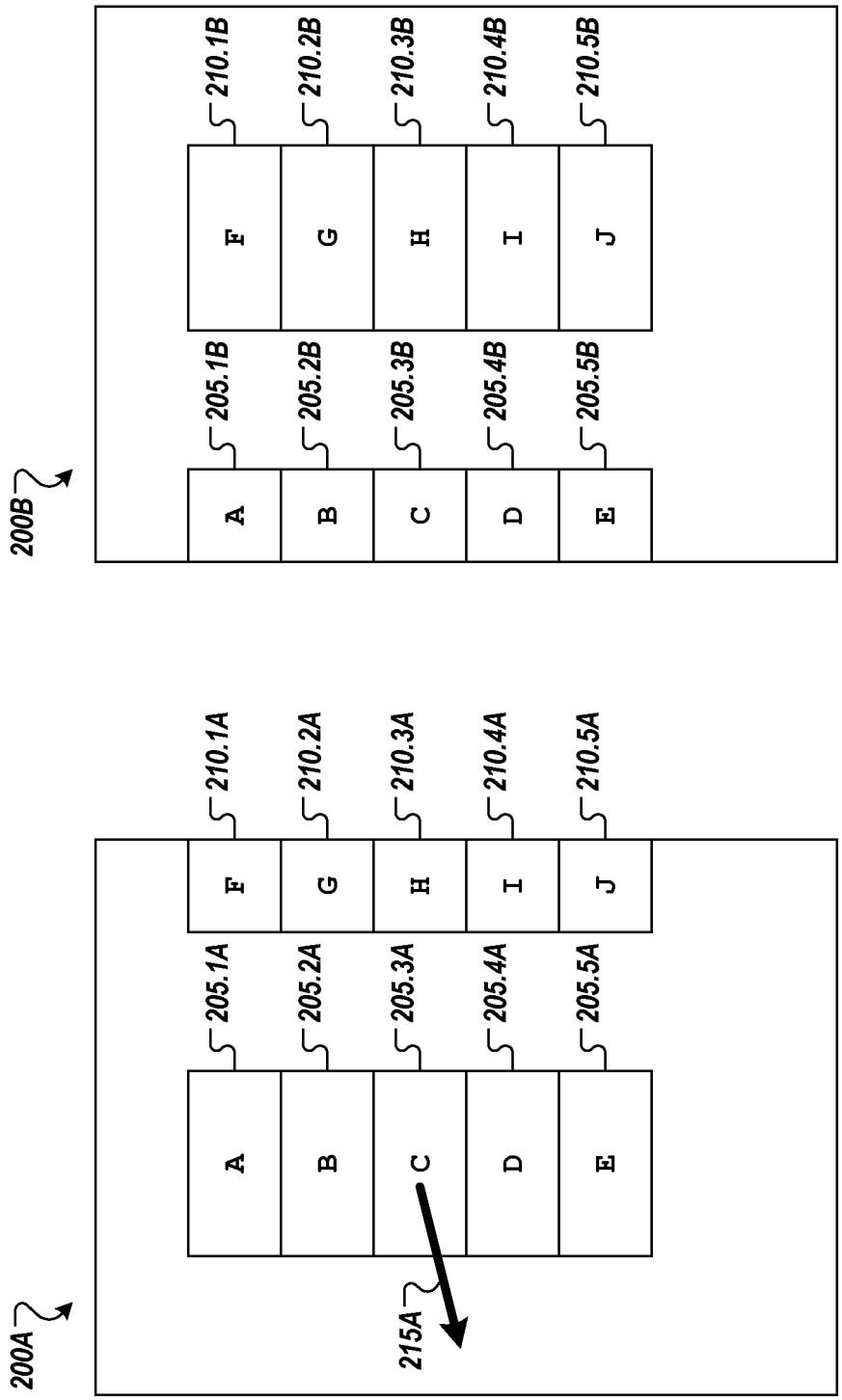

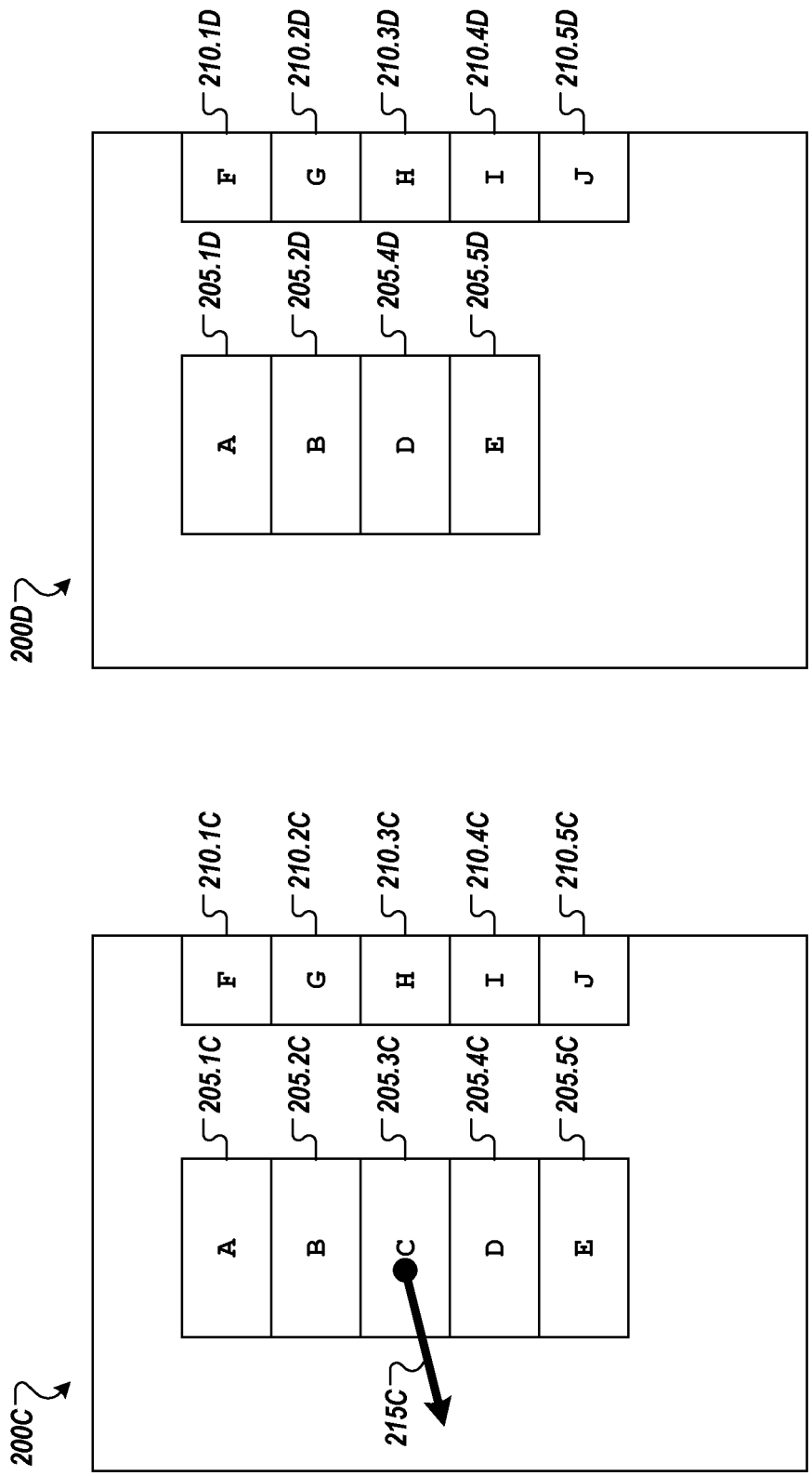

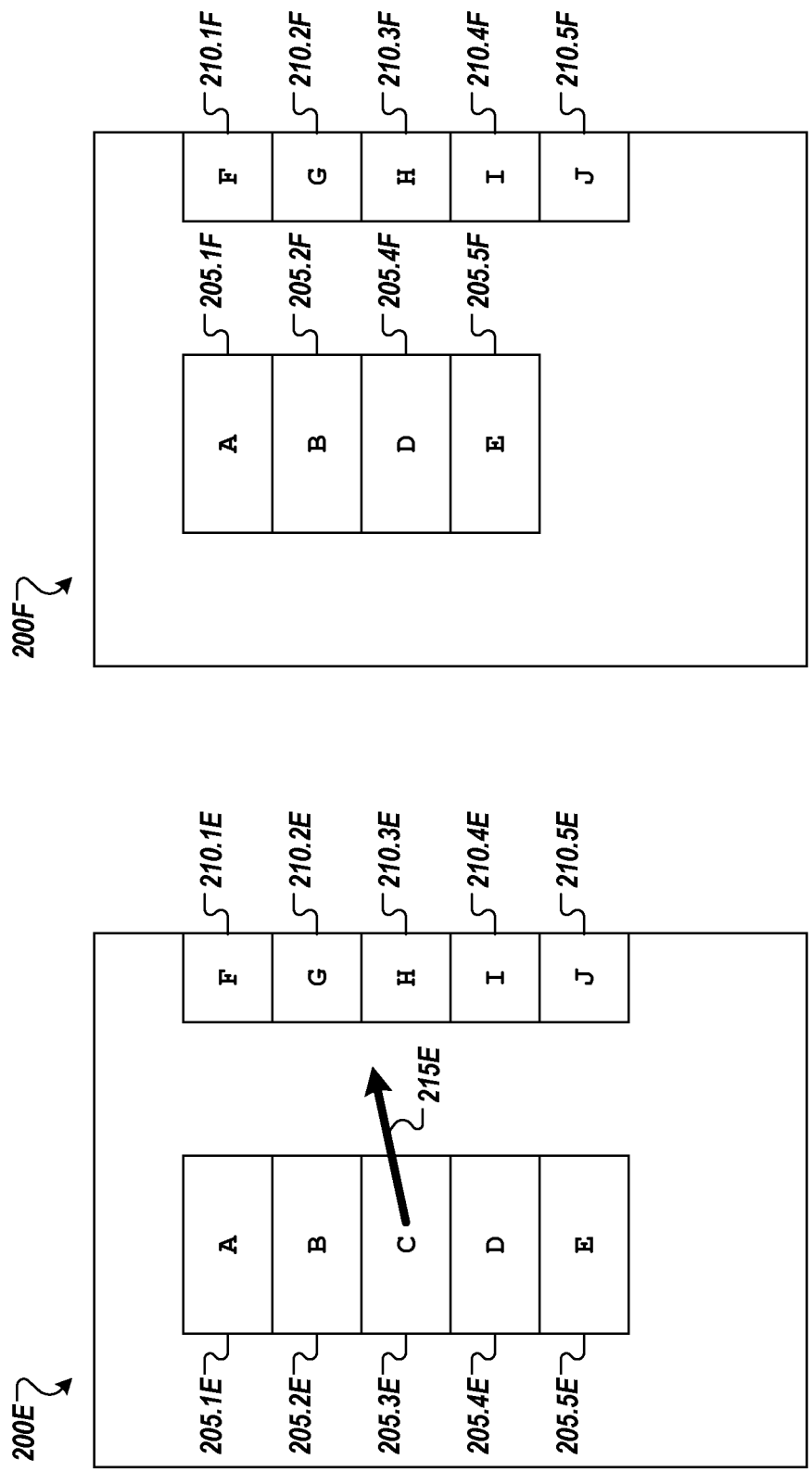

SWIPE GESTURE CLASSIFICATION

FIELD

The subject technology generally relates to touch screen interfaces and, in particular, relates to swipe gesture classification.

BACKGROUND

In some touch screen implementations, for example, on mobile phones or tablet computers, swipe gestures, i.e., swiping a finger or a stylus along the touch screen, may be used to denote different types of commands. For example, swipe gestures may be used for scrolling within a user interface, deleting graphical objects within a user interface, or dragging graphical objects within a user interface. In some cases, a computer with a touch screen may misinterpret a swipe gesture entered by a user. For example, a user may enter a swipe gesture while intending to scroll within the user interface, but the touch screen may misinterpret the user's swipe gesture as entering a command to delete a graphical object within the user interface. As the foregoing illustrates, a new approach to swipe gesture classification may be desirable.

SUMMARY

The disclosed subject matter relates to a computer-implemented method for processing a swipe gesture. The method includes receiving an indication of a swipe gesture via a touch screen. The indication of the swipe gesture includes data representing a starting location and data representing a first direction. The method includes determining whether the indication of the swipe gesture is associated with a hold time at the starting location exceeding a first threshold time. The method includes determining whether the first direction is within a set of possible directions associated with a first command. At least one direction is within the set of possible directions associated with the first command and at least one direction is not within the set of possible directions associated with the first command. The method includes providing for execution of the first command, in a case where it is determined that the first direction is within the set of possible directions associated with the first command and the indication of the swipe gesture is not associated with the hold time at the starting location exceeding the first threshold time. The method includes providing for execution of a second command, in a case where it is determined that the first direction is not within the set of possible directions associated with the first command or the indication of the swipe gesture is associated with the hold time at the starting location exceeding the first threshold time.

The disclosed subject matter further relates to a computer-readable medium. The computer-readable medium includes instructions that, when executed by a computer, cause the computer to implement a method for processing a swipe gesture. The instructions include code for receiving an indication of a swipe gesture. The indication of the swipe gesture includes data representing a starting location and data representing a first direction. The instructions include code for determining whether the indication of the swipe gesture is associated with a hold time at the starting location exceeding a first threshold time. The instructions include code for determining whether the first direction is within a set of possible directions associated with a first command. At least one direction is within the set of possible directions associated with the first command and at least one direction is not within the set of possible directions associated with the first command. The instructions include code for providing an output corresponding to the first command, in a case where it is determined that the first direction is within the set of possible directions associated with the first command and the indication of the swipe gesture is not associated with the hold time at the starting location exceeding the first threshold time. The instructions include code for providing an output corresponding to a second command, in a case where it is determined that the first direction is not within the set of possible directions associated with the first command or the indication of the swipe gesture is associated with the hold time at the starting location exceeding the first threshold time.

The disclosed subject matter further relates to a system. The system includes one or more processors. The system also includes a memory that includes instructions that, when executed by the one or more processors, cause the one or more processors to implement a method for processing a swipe gesture. The instructions include code for receiving an indication of a swipe gesture via a touch screen. The indication of the swipe gesture includes data representing a starting location and data representing a first direction. The starting location is associated with a graphical object within a set of graphical objects. The instructions include code for determining whether the indication of the swipe gesture is associated with a hold time at the starting location exceeding a first threshold time. The instructions include code for determining whether the first direction is within a set of possible directions associated with a first command. At least one direction is within the set of possible directions associated with the first command and at least one direction is not within the set of possible directions associated with the first command. The first command is a command to drag the set of graphical objects in a direction corresponding to the first direction. The instructions include code for providing an output corresponding to the first command, in a case where it is determined that the first direction is within the set of possible directions associated with the first command and the indication of the swipe gesture is not associated with the hold time at the starting location exceeding the first threshold time. The instructions include code for providing an output corresponding to a second command, in a case where it is determined that the first direction is not within the set of possible directions associated with the first command or the indication of the swipe gesture is associated with the hold time at the starting location exceeding the first threshold time. The second command is a command to delete the graphical object within the set of graphical objects.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

FIGS. 2A-2F illustrate examples of touch screens within a system implementing swipe gesture classification.

DETAILED DESCRIPTION

Figure 1:
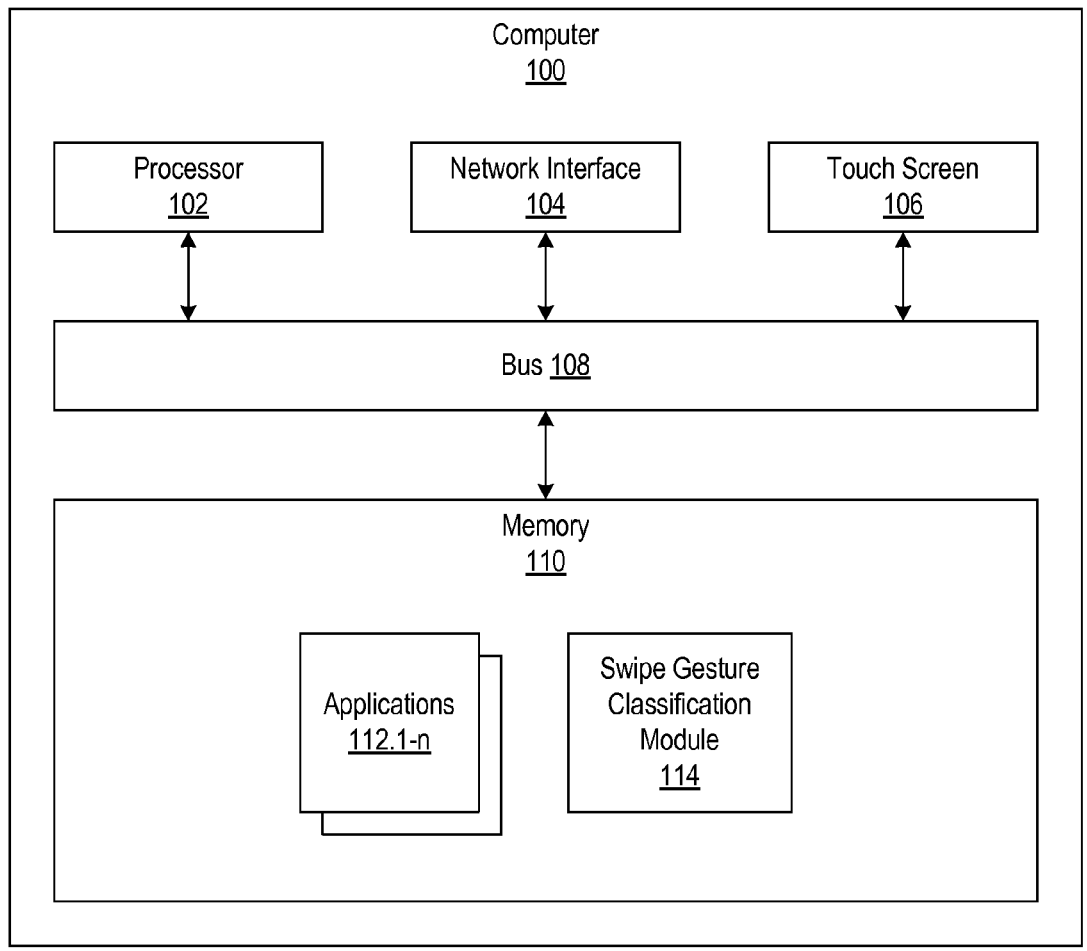
FIG. 1 illustrates an example of a computer configured to implement swipe gesture classification.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As set forth above, in some touch screen interfaces, a computer may occasionally misinterpret the user's intent in entering a swipe gesture. For example, in an interface where swipe gestures are used for both dragging graphical objects and deleting graphical objects, the computer may misinterpret a swipe gesture with which the user intended to drag the graphical objects as a swipe gesture for deleting a graphical object or vice versa. Thus, an approach for swipe gesture classification that addresses the above may be desirable.

Furthermore, in some implementations, a drag command may be relatively simple to undo (e.g., if a user accidentally enters a left drag command, he/she can easily undo the command by entering a right drag command). However, a delete command may be more difficult to undo (e.g., if a user accidentally deletes a tab of a web browser, he/she may need to remember the web address being displayed in the tab and reload the corresponding webpage to undo the command). As the foregoing illustrates, an approach to swipe gesture classification in a user interface where a swipe gesture may correspond to either one of two commands (e.g., dragging or deleting) that would more frequently classify an "ambiguous" swipe gesture as corresponding to a specified one of the two commands (e.g., dragging) may be desirable.

The subject technology is related to classifying and processing or responding to a swipe gesture received via a touch screen. The swipe gesture may include, for example, swiping a finger or a stylus along the touch screen. In some aspects, a computer (e.g., a mobile phone or a tablet computer with a touch screen) receives an indication of a swipe gesture via a touch screen. The indication of the swipe gesture includes data representing a starting location of the swipe gesture and data representing a first direction of the swipe gesture. The computer determines whether the indication of the swipe gesture is associated with a hold time at the starting location exceeding a first threshold time (e.g., 0.2 seconds). For example, the computer may determine whether the user held his/her finger/stylus at the starting location for at least the first threshold time before initiating the movement of the swipe gesture. The computer may determine whether the first direction is within a set of possible directions associated with a first command (e.g., a command to drag one or more graphical objects). At least one direction may be within a set of directions associated with the first command and at least one other direction may not be within the set of directions associated with the first command. For example, it may be possible to drag the graphical objects in the leftward direction but not in the rightward direction.

In an event that the first direction is within the set of possible directions associated with the first command and the indication of the swipe gesture is not associated with the hold time at the starting location exceeding the first threshold time, the computer provides for execution of the first command (e.g., provides for dragging the one or more graphical objects) based on the first direction being within the set of possible directions associated with the first command and the indication of the swipe gesture not being associated with the hold time a the starting location exceeding the first threshold time. In an event that the first direction is not within the set of possible directions associated with the first command or the indication of the swipe gesture is associated with a hold time at the starting location exceeding the first threshold time, the computer provides for execution of a second command (e.g., a command to delete a graphical object associated with the starting location of the swipe gesture) based on the first direction being not within the set of possible directions associated with the first command or the indication of the swipe gesture being associated with the hold time at the starting location exceeding the first threshold time.

Advantageously, in accordance with some aspects of the subject technology, a swipe gesture may be interpreted as corresponding to a drag command if the swipe gesture is associated with a direction in which dragging is possible and the swipe gesture is not a hold-and-swipe. The swipe gesture maybe interpreted as corresponding to a delete command if the swipe gesture is associated with a direction in which dragging is not possible or the swipe gesture is a hold-and-swipe.

As used herein, the phrase "hold-and-swipe" encompasses its plain and ordinary meaning including, but not limited to a gesture where the user holds a touching object (e.g., a finger or a stylus) at a location on a touch screen for at least a threshold time (e.g., 0.2 seconds) before swiping the touching object along the touch screen.

FIG. 1 illustrates an example of a computer 100 configured to implement swipe gesture classification.

The computer 100 may correspond to a laptop computer, a desktop computer, a mobile phone, a tablet computer, a personal digital assistant, a portable audio player, a television coupled to one or more processors, etc. As shown, the computer 100 includes a processor 102, a network interface 104, a touch screen 106, a bus 108, and a memory 110. The processor 102 is configured to execute computer instructions that are stored in a computer-readable medium, for example, the memory 110. The processor may be a central processing unit (CPU). While only one processor 102 is illustrated in FIG. 1, the subject technology may be implemented with one or more processors. The network interface 104 is configured to allow the computer system 100 to transmit and receive data in the network (e.g., a cellular network, a wireless local area network, a wired local area network, or the Internet). The network interface 104 may include one or more network interface cards (NICs). The touch screen 106 may be configured to display data, for example, graphical components including text, images, or videos, within a display area. The touch screen 106 may be configured to detect the presence and location of touch within the display area. The touch may be via a human finger or hand or via another object, e.g., a stylus. The touch screen 106 may be a single touch screen or a multi-touch screen. The touch screen 106 may be configured to detect swipe gestures. The phrase "swipe gesture," as used herein, encompasses its plain and ordinary meaning including, but not limited to, an initial touching on a screen by a touching object, e.g., a finger or a stylus, followed by dragging the touching object along the screen. The bus 108 may be configured to transfer data or instructions between components within the computer system 100. For example, the bus 108 may be configured to transfer data or instructions between the processor 102, the network interface 104, the touch screen 106, and the memory 110. The memory 110 stores data and instructions. As illustrated, the memory stores one or more applications 112.1-*n* and a swipe gesture classification module 114. While only a single memory 110 is illustrated in FIG. 1, the subject technology may be implemented in conjunction with multiple separate memory components connected to one another via a bus (e.g., bus 108).

The applications 112.1-*n* may include any known applications. Example applications may include a web browser application, an audio call application, a video call application, a text messaging application, a word processing application, an image or photograph viewing application, a video player application, etc. The subject technology may be implemented in conjunction with any application, including an application that includes displaying content that is larger than the size of the touch screen 106. One or more of the applications 112.1-*n* may include instructions for interfacing with a user via a touch screen (e.g., touch screen 106). One or more of the applications 112.1-*n* may include instructions to take a first action in response to a swipe gesture having a direction within set of directions that is not a hold-and-swipe and instructions to take a second action in response to a swipe gesture having a direction outside the set of directions or a swipe gesture that is a hold-and-swipe.

The swipe gesture classification module 114 may include instructions for classifying a swipe gesture. The swipe gesture classification module 114 may include instructions for receiving an indication of a swipe gesture. The indication of the swipe gesture may include data representing a starting location of the swipe gesture and data representing a first direction of the swipe gesture. The swipe gesture classification module 114 may include instructions for determining whether the indication of the swipe gesture is associated with a hold time at the starting location exceeding a first threshold time (e.g., 0.2 seconds). The swipe gesture classification module 114 may include instructions for determining whether the first direction is within a set of possible directions associated with the first command. Some directions may be within the set of possible directions, while other directions may not be within the set of possible directions. The swipe gesture classification module 114 may include instructions for, in an event that the first direction is within the set of possible directions and the indication of the swipe gesture is not associated with the hold time at the starting location exceeding the first threshold time, providing an output corresponding to the first command (e.g., providing for execution of the first command). The swipe gesture classification module 114 may include instructions for, in an event that the first direction is not within the set of possible directions associated with the first command or the indication of the swipe gesture is associated with the hold time at the starting location exceeding the first threshold time providing an output corresponding to the second command (e.g., providing for execution of the second command). The second command is different from the first command. For example, the first command may correspond to a dragging command, and the second command may correspond to a deleting command.

FIGS. 2A-2F illustrate examples of touch screens 200A, 200B, 200C, 200D, 200E, and 200F within a system (e.g., computer 100) implementing swipe gesture classification. The touch screens 200A-200F may correspond to touch screen 106 of FIG. 1.

FIG. 2A illustrates touch screen 200A. The touch screen 200A includes two stacks including graphical objects 205.1-5A and 210.1-5A (represented as rectangles including the characters A-J inside). In some examples, the graphical objects 205.1-5A and 210.1-5A correspond to tabs of a web browser. Each tab may correspond to a display of a webpage. In some examples, the graphical objects 205.1-5A and 210.1-5A correspond to icons representing applications (e.g., applications 112.1-*n*). In some examples, the graphical objects 205.1-4A and 210.1-5A may correspond to any other data that can be graphically represented, for example, text or email messages, photographs, videos, pieces in a board game application, representations of objects in a video game application, etc. Also, while the subject technology is described here in conjunction with two stacks of five graphical objects 205.1-5A and 210.1-5A, the subject technology may be implemented with any number of graphical objects arranged in any manner. Graphical objects 205.1-5A are fully displayed within the touch screen 200A. However, graphical objects 210.1-5A are partially displayed adjacent to an edge of the touch screen 200A. Dragging the graphical objects 205.1-5A and 210.1-5A causes the graphical objects 210.1-5A to be fully displayed (see, for example, FIG. 2B).

A swipe gesture 215A starting on graphical object 205.3A is indicated by an arrow. As shown, the swipe gesture is in a leftward direction, for example, within 45 degrees of directly to the left. A computer (e.g., computer 100) coupled to the touch screen 200A may determine that the swipe gesture 215A is within a set of possible directions associated with a dragging command (e.g., within 45 degrees of directly to the left) and that the swipe gesture 215A is not associated with a hold time at the starting location of the swipe gesture (the right end of the swipe gesture 215A within graphical object 205.3A). Based on these determinations, the computer may determine that the swipe gesture 215A corresponds to a dragging command. In response to the determination, the computer may provide for dragging the graphical objects 205.1-5A and 210.1-5A within the touch screen 200A to the positions indicated in touch screen 200B of FIG. 2B.

FIG. 2B illustrates touch screen 200B. The touch screen 200B corresponds to the touch screen 200A after execution of the dragging command entered the by the user via the swipe gesture 215A. As shown, the positions of graphical objects 205.1-5B and 210.1-5B are shifted to the left relative to the positions of graphical objects 205.1-5A and 210.1-5A of FIG. 2A, and graphical objects 210.1-5B are fully displayed, while graphical objects 205.1-5B are partially displayed adjacent to an edge of the touch screen 200B, as a result of the execution of the dragging command. In other words, the graphical objects 205.1-5B and 210.1-5B have been dragged to the left relative to the graphical objects 205.1-5A and 210.1-5A.

FIG. 2C illustrates touch screen 200C. Similarly to the touch screen 200A, the touch screen 200C includes graphical objects 205.1-5C and 210.1-5C arranged in two stacks. In some examples, the graphical objects correspond to tabs of a web browser window or application graphical objects. The touch screen 200C also illustrates a hold-and-swipe gesture 215C, where an associated hold for at least a first threshold time (e.g., at least 0.2 seconds) is represented by a black circle within graphical object 205.3C and an associated swipe gesture is represented by the arrow. As a result of the hold-and-swipe gesture 215C, a computer (e.g., computer 100) associated with the touch screen 200C may determine that, while the direction of the swipe gesture 215C is within a set of directions (e.g., within 45 degrees of directly to the left) for a dragging command, the swipe gesture 215C is associated with a hold time (represented by the black circle) at the starting location of the swipe gesture 215C for at least a first threshold time. Based on these determinations, the computer may determine that the swipe gesture 215C corresponds to a deleting command. In response to the determination, the computer may provide for deletion of the graphical object 205.3C associated with the starting location of the swipe gesture 215C, resulting in a display similar to the display of touch screen 200D of FIG. 2D.

FIG. 2D illustrates touch screen 200D. Similarly to the touch screen 200C, the touch screen 200D includes graphical objects 205.1-2D, 205.4-5D, and 210.1-5D. However, as shown, the touch screen 200D does not include a graphical object corresponding to graphical object 205.3C (a graphical object with the letter "C"), as graphical object 205.3C has been deleted by the deleting command corresponding to swipe gesture 215C on touch screen 200C. As a result of the deletion, the graphical objects 205.4-5D may, in some aspects, be shifted upward relatively to the positions of graphical objects 205.4-5C of FIG. 2C.

FIG. 2E illustrates touch screen 200E. Similarly to the touch screens 200A and 200C, the touch screen 200E includes graphical objects 205.1-5E and 210.1-5E arranged in two stacks. In some examples, the graphical objects correspond to tabs of a web browser window or application graphical objects. The touch screen 200E also illustrates a swipe gesture 215E in the rightward direction. As a result of the swipe gesture 215E, a computer (e.g., computer 100) associated with the touch screen 200E may determine that, the direction of the swipe gesture 215E is not within a set of directions (e.g., within 45 degrees of directly to the left) for a dragging command (the graphical objects 205.1-5E and 210.1-5E may not be able to be dragged to the right, as there may be no graphical objects to the left of the stack of graphical objects 205.1-5E). However, as shown, the swipe gesture 215E is not be associated with a hold time at the starting location of the swipe gesture 215E for at least a first threshold time. Based on these determinations, the computer may determine that the swipe gesture 215E corresponds to a deleting command. In response to the determination, the computer may provide for deletion of the graphical object 205.3E associated with the starting location of the swipe gesture 215E, resulting in a display similar to the display of touch screen 200F of FIG. 2F.

FIG. 2F illustrates touch screen 200F. Similarly to the touch screen 200E, the touch screen 200F includes graphical objects 205.1-2F, 205.4-5F, and 210.1-5F. However, as shown, the touch screen 200F does not include a graphical object corresponding to graphical object 205.3E (a graphical object with the letter "C"), as graphical object 205.3E has been deleted by the deleting command corresponding to swipe gesture 215E on touch screen 200E. As a result of the deletion, the graphical objects 205.4-5F may, in some aspects, be shifted upward relatively to the positions of graphical objects 205.4-5E of FIG. 2E.

Figure 3:
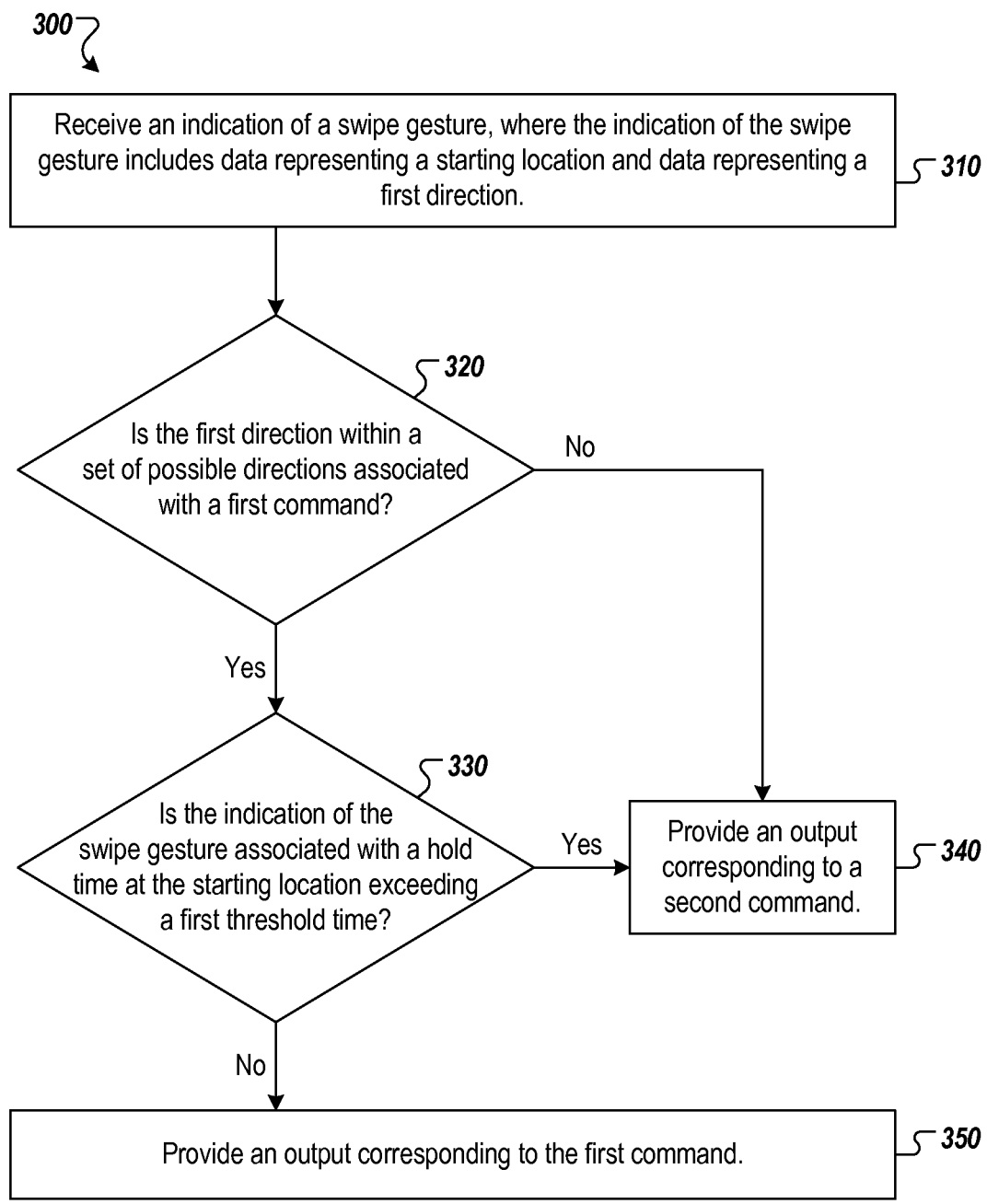
FIG. 3 illustrates an example process by which a swipe gesture is classified.

FIG. 3 illustrates an example process 300 by which a swipe gesture may be classified.

The process 300 begins at step 310, where a computer (e.g., computer 100, via operation of the swipe gesture classification module 114) receives an indication of a swipe gesture, where the indication of the swipe gesture includes data representing a starting location of the swipe gesture and data representing a first direction of the swipe gesture. The indication of the swipe gesture may be received via a touch screen (e.g., touch screen 106, 200A, 200C, or 200E). The starting location may be associated with a graphical object (e.g., one of the graphical objects 205.1-5A or 210.1-5A of FIG. 2A) within a set of graphical objects. The graphical object (e.g., graphical object 205.3A) associated with the starting location (e.g., for swipe gesture 215A) may correspond to a tab of a web browser, and the set of graphical objects (e.g., the stack of graphical objects including graphical objects 205.1-5A or the two stacks of graphical objects including graphical objects 205.1-5A and 210.1-5A) may correspond to one or more stacks of tabs of the web browser or one or more sets of tabs of the web browser. Alternatively, the graphical objects may represent applications, electronic messages (e.g., text messages or email messages), documents in a document management program, or any other data units that can be represented using graphical objects.

In step 320, the computer determines whether the first direction is within a set of possible directions associated with a first command. In some examples, the first command may be a command to drag the set of graphical objects. In some examples, (e.g., as illustrated in FIGS. 2A, 2C, and 2E) it may be possible to drag the set of graphical objects in the leftward direction but not in the rightward direction (e.g., because the set of graphical objects is already placed as far to the right as possible). In such circumstances, the set of possible directions associated with the first command may correspond to a set of directions within a threshold angle of directly to the left. The threshold angle may be, for example, 30 degrees, 45 degrees, 60 degrees, or ninety degrees. In some examples, the threshold angle may have any value between 0 degrees and 90 degrees. If the first direction is within a set of possible directions associated with the first command, the process 300 continues to step 330. If the first direction is not within a set of possible directions associated with the first command, the process 300 continues to step 340.

In step 330, the computer determines whether the indication of the swipe gesture associated with a hold time at the starting location exceeding a first threshold time. The first threshold time may be any amount of time detectable by the computer. The first threshold time may be at least 0.2 seconds and/or at most 0.5 seconds. The swipe gesture may be associated with a hold time at the starting location exceeding the first threshold time if the user held a touching object (e.g., a finger or a stylus) at the starting location for an amount of time exceeding the first threshold time before initiating the swipe gesture. The swipe gesture may be associated with a hold time at the starting location exceeding the first threshold time if the swipe gesture corresponds to a hold-and-swipe gesture with a hold time at the starting location exceeding the first threshold time.

In step 340, in an event that the first direction is not within the set of possible directions associated with the first command or the indication of the swipe gesture is associated with the hold time at the starting location exceeding the first threshold time, the computer may provide an output corresponding to a second command based on the first direction being not within the set of possible directions associated with the first command or the indication of the swipe gesture being associated with the hold time at the starting location exceeding the first threshold time. The second command may be a command to delete the graphical object within the set of graphical objects that is associated with the starting location of the swipe gesture (e.g., graphical object 205.3C in FIG. 2C, which is associated with the starting location of the swipe gesture 215C). In some examples, the computer may provide for execution of the second command in response to the swipe gesture (e.g., provide for deletion of the graphical object 205.3C in response to the swipe gesture 215C to result in a display similar to that of touch screen 200D of FIG. 2D). After step 340, the process 300 ends.

In step 350, in an event that the first direction is within the set of possible directions associated with the first command and the indication of the swipe gesture is not associated with the hold time at the starting location exceeding the first threshold time, the computer may provide an output corresponding to the first command based on the first direction being within the set of possible directions associated with the first command and the indication of the swipe gesture being not associated with the hold time at the starting location exceeding the first threshold time. In some examples, the computer may provide for execution of the first command in response to the swipe gesture (e.g., provide for dragging leftward of the graphical objects 205.1-5A and 210.1-5A in response to swipe gesture 215A of FIG. 2A, resulting in a display similar to that of touch screen 200B of FIG. 2B). After step 350, the process 300 ends.

In one implementation, instructions for implementing the steps 310-350 in the process 300 may be stored in a memory of a computer and may be implemented by the computer. The steps 310-350 in the process 300 may be carried out in series. Alternatively, two or more of the steps 310-350 in the process 300 may be carried out in parallel.

The subject technology is described above in conjunction with the first command corresponding to a drag command and the second command corresponding to a delete command. However, the first command and/or the second may correspond to any other commands that may be implemented in conjunction with a touch screen, for example, the first command and/or the second command may correspond to one or more of: a drag command, a delete command, a scroll command, a move graphical object command, an open file (e.g., application, document, message, image, video, etc.) associated with graphical object command, a close command, a minimize command, a maximize command, a display home screen command, etc. The first command may be different from the second command.

The subject technology is described above in conjunction with the touching object for touching a touch screen being, for example, a finger or a stylus. However, the subject technology may be implemented in conjunction with any other touching object. For example, one or more of a pen, two or more fingers, or a full hand may be used as a touching object in some implementations.

Terms such as "left," right," "up," "down," and the like as used in this disclosure should be understood as referring to an arbitrary frame of reference, rather than to the ordinary gravitational frame of reference. Thus, a leftward direction may extend leftward, rightward, upward, downward, diagonally, horizontally, or in any other direction in a gravitational frame of reference. Similarly, a rightward direction may extend leftward, rightward, upward, downward, diagonally, horizontally, or in any other direction in a gravitational frame of reference.

Figure 4:
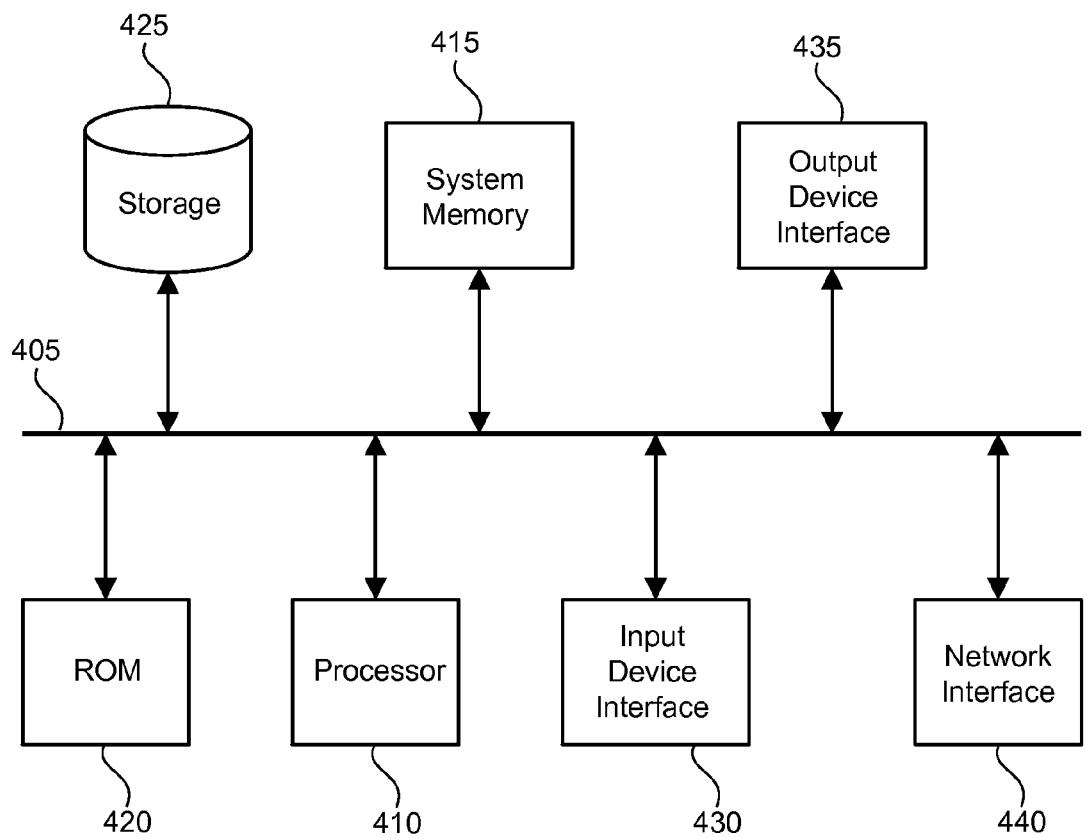
FIG. 4 conceptually illustrates an example electronic system with which some implementations of the subject technology are implemented.

FIG. 4 conceptually illustrates an electronic system 400 with which some implementations of the subject technology are implemented. For example, the computer 100 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for swipe gesture classification in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touchscreen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for processing a swipe gesture, the method comprising:
   receiving an indication of a swipe gesture via a touch screen, wherein the indication of the swipe gesture comprises data representing a starting location and data representing a first direction, the starting location corresponding to a starting graphical object displayed in a first stack of graphical objects, wherein the first stack of graphical objects comprises first plural graphical objects fully displayed within the touch screen, and wherein a second stack of graphical objects comprises second plural graphical objects partially displayed within the touch screen;
   determining whether the indication of the swipe gesture is associated with a hold time at the starting location exceeding a first threshold time;
   determining whether the first direction is within a set of possible directions associated with a first command, wherein at least one direction is within the set of possible directions associated with the first command and at least one direction is not within the set of possible directions associated with the first command, and wherein the first command is for fully displaying the second plural graphical objects of the second stack and partially displaying the first plural graphical objects of the first stack;
   providing for execution of the first command, in a case where it is determined that the first direction is within the set of possible directions associated with the first command and the indication of the swipe gesture is not associated with the hold time at the starting location exceeding the first threshold time;
   providing for execution of a second command, in a case where it is determined that the first direction is not within the set of possible directions associated with the first command; and
   providing for execution of the second command, in a case where it is determined that the indication of the swipe gesture is associated with the hold time at the starting location exceeding the first threshold time, wherein the second command comprises a command to delete the starting graphical object from the first stack, and wherein the first and second plural graphical objects, including the starting graphical object, correspond to tabs of a web browser, photographs, videos, or pieces in a board game application.

2. The method of claim 1, wherein the first command comprises a command to drag the first stack and the second stack.

3. The method of claim 1, wherein the first threshold time is at least 0.2 seconds.

4. The method of claim 1, wherein the first threshold time is at most 0.5 seconds.

5. The method of claim 1, wherein the second plural graphical objects partially displayed within the touch screen are partially displayed adjacent to a first edge of the touch screen, and wherein partially displaying the first plural graphical objects comprises partially displaying the first plural graphical objects adjacent to a second edge of the touch screen.

6. The method of claim 5, wherein the first edge is on a different side of the touch screen from the second edge.

7. A computer-readable medium for processing a swipe gesture, the computer-readable medium comprising instructions which, when executed by a computer, cause the computer to:
   receive an indication of a swipe gesture, wherein the indication of the swipe gesture comprises data representing a starting location and data representing a first direction, the starting location corresponding to a starting graphical object displayed in a first stack of graphical objects, wherein the first stack of graphical objects comprises first plural graphical objects fully displayed within a touch screen, and wherein a second stack of graphical objects comprises second plural graphical objects partially displayed within the touch screen;
   determine whether the indication of the swipe gesture is associated with a hold time at the starting location exceeding a first threshold time;
   determine whether the first direction is within a set of possible directions associated with a first command, wherein at least one direction is within the set of possible directions associated with the first command and at least one direction is not within the set of possible directions associated with the first command, and wherein the first command is for fully displaying the second plural graphical objects of the second stack and partially displaying the first plural graphical objects of the first stack;

provide an output corresponding to the first command, in a case where it is determined that the first direction is within the set of possible directions associated with the first command and the indication of the swipe gesture is not associated with the hold time at the starting location exceeding the first threshold time;

provide an output corresponding to a second command, in a case where it is determined that the first direction is not within the set of possible directions associated with the first command; and provide the output corresponding to the second command, in a case where it is determined that the indication of the swipe gesture is associated with the hold time at the starting location exceeding the first threshold time, wherein the second command comprises a command to delete the starting graphical object from the first stack, and wherein the first and second plural graphical objects, including the starting graphical object, correspond to tabs of a web browser, photographs, videos, or pieces in a board game application.

8. The computer-readable medium of claim 7, wherein the first command comprises a command to drag the first stack and the second stack.

9. The computer-readable medium of claim 7, wherein the first threshold time is at least 0.2 seconds.

10. The computer-readable medium of claim 7, wherein the first threshold time is at most 0.5 seconds.

11. The computer-readable medium of claim 7, further comprising instructions which, when executed by the computer, cause the computer to:

provide for execution of the first command, in the case where it is determined that the first direction is within the set of possible directions associated with the first command and the indication of the swipe gesture is not associated with the hold time at the starting location exceeding the first threshold time.

12. The computer-readable medium of claim 7, further comprising instructions which, when executed by the computer, cause the computer to:

provide for execution of the second command, in the case where it is determined that the first direction is not within the set of possible directions associated with the first command or the indication of the swipe gesture is associated with the hold time at the starting location exceeding the first threshold time.

13. The computer-readable medium of claim 7, wherein the instructions to receive the indication of the swipe gesture comprise instructions which, when executed by the computer, cause the computer to:

receive the indication of the swipe gesture via a touch screen.

14. A system for processing a swipe gesture, the system comprising:

one or more processors; and a memory comprising instructions which, when executed by the one or more processors, cause the one or more processors to:

receive an indication of a swipe gesture via a touch screen, wherein the indication of the swipe gesture comprises data representing a starting location and data representing a first direction, the starting location corresponding to a starting graphical object displayed in a first stack of graphical objects, wherein the first stack of graphical objects comprises first plural graphical objects fully displayed within the touch screen, and wherein a second stack of graphical objects comprises second plural graphical objects partially displayed within the touch screen;

determine whether the indication of the swipe gesture is associated with a hold time at the starting location exceeding a first threshold time;

determine whether the first direction is within a set of possible directions associated with a first command, wherein at least one direction is within the set of possible directions associated with the first command and at least one direction is not within the set of possible directions associated with the first command, and wherein the first command is for fully displaying the second plural graphical objects of the second stack and partially displaying the first plural graphical objects of the first stack;

provide an output corresponding to the first command, in a case where it is determined that the first direction is within the set of possible directions associated with the first command and the indication of the swipe gesture is not associated with the hold time at the starting location exceeding the first threshold time;

provide an output corresponding to a second command, in a case where it is determined that the first direction is not within the set of possible directions associated with the first command; and provide the output corresponding to the second command, in a case where it is determined that the indication of the swipe gesture is associated with the hold time at the starting location exceeding the first threshold time, wherein the second command comprises a command to delete the starting graphical object from the first stack, and wherein the first and second plural graphical objects, including the starting graphical object, correspond to tabs of a web browser, photographs, videos, or pieces in a board game application.

* * * * *